Figure 1:
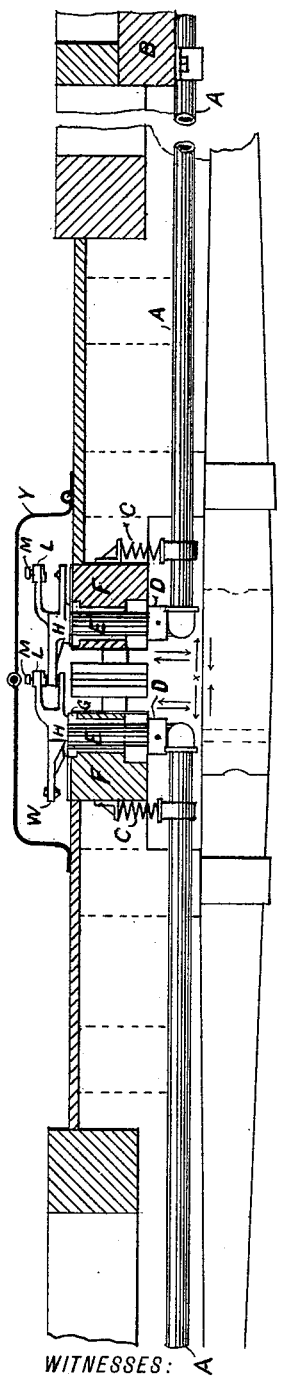

(No Model.) 4 Sheets—Sheet 1.
D. H. SHERMAN.
DEVICE FOR COUPLING THE STEAM PIPES OF RAILWAY TRAINS.
No. 391,089. Patented Oct. 16, 1888.

WITNESSES:
Robt F. Gaylord,
Frank E. Hartley,

INVENTOR,
Daniel H. Sherman
BY Duncan Curtis Ray
ATTORNEYS.

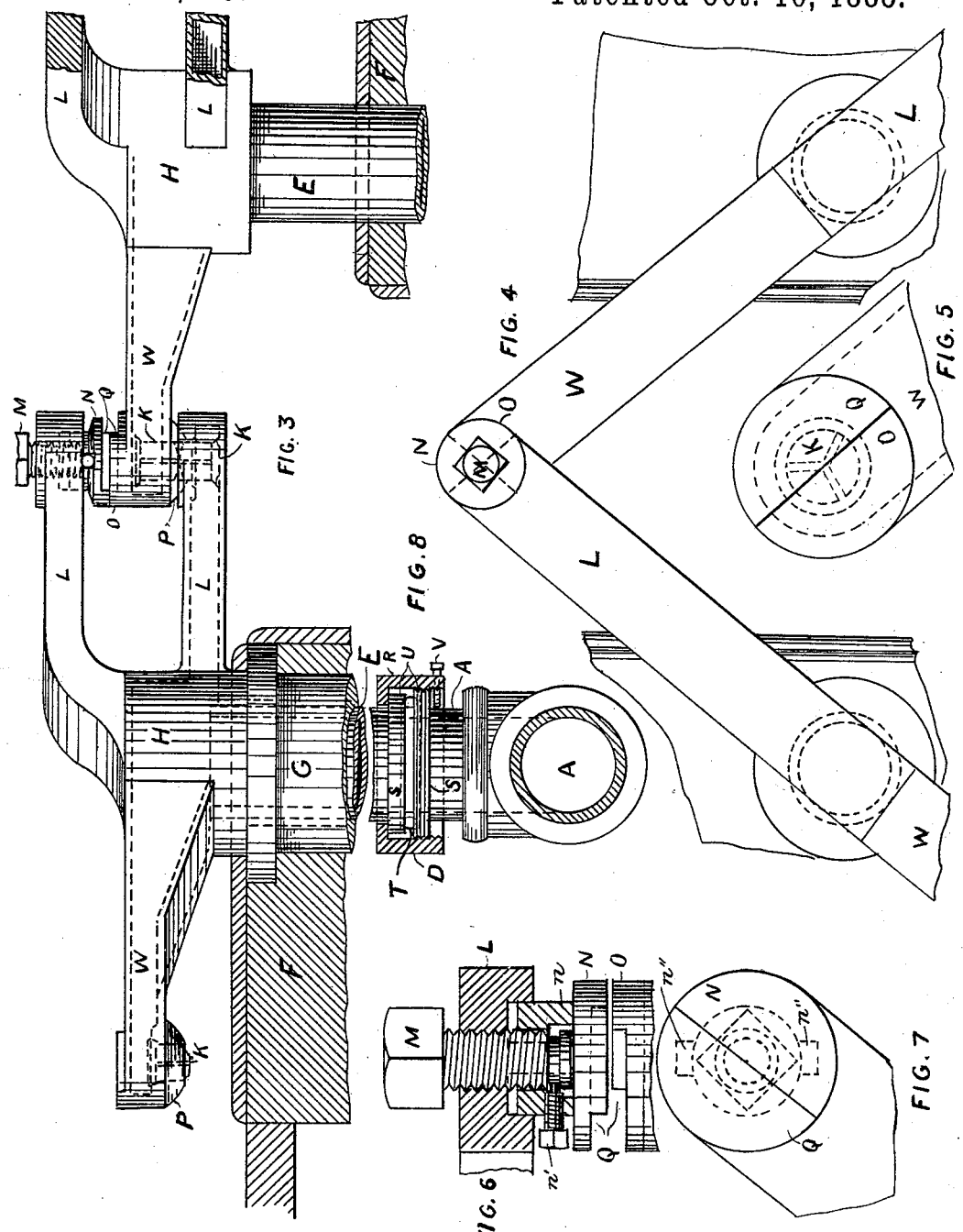

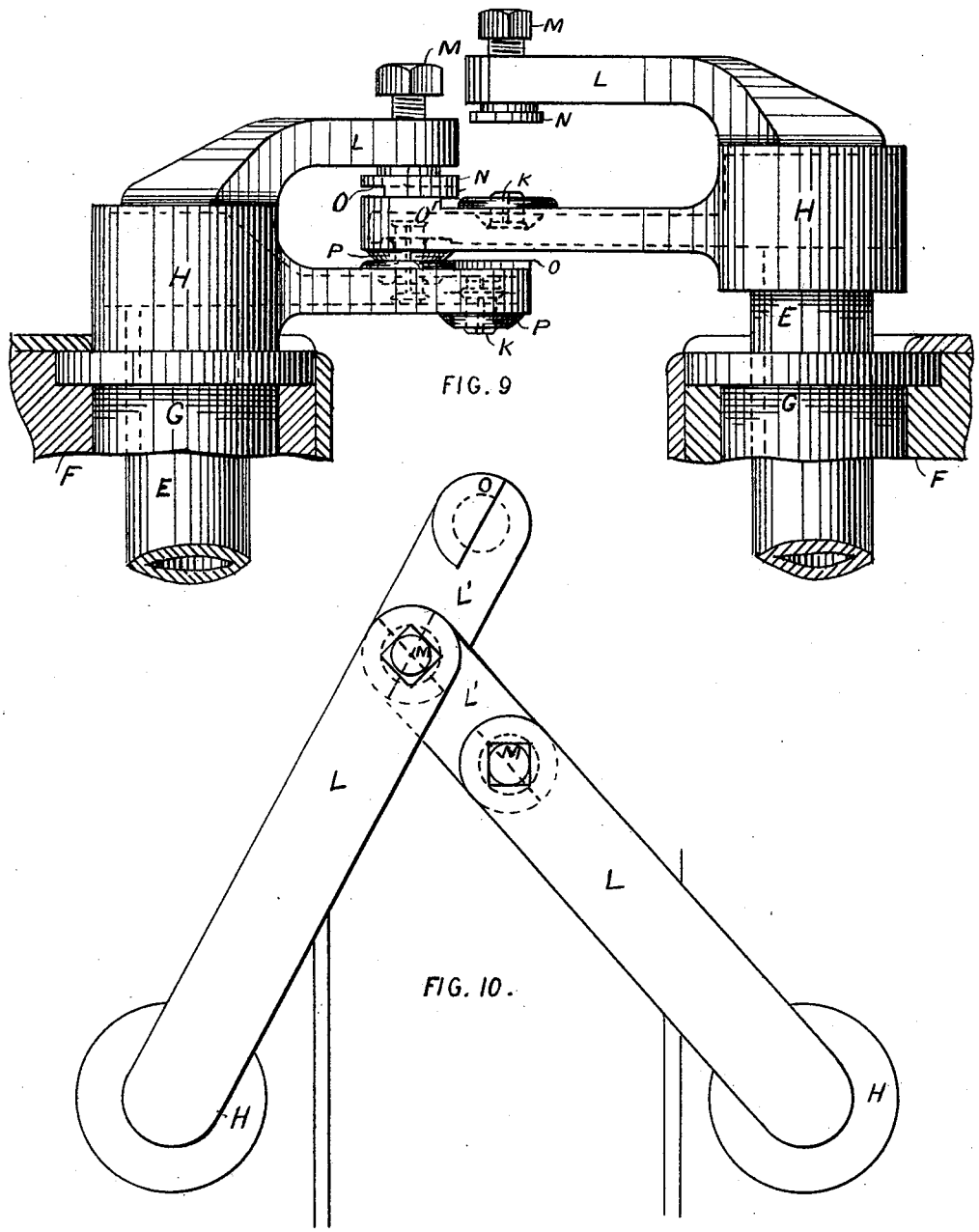

(No Model.) 4 Sheets—Sheet 4.
D. H. SHERMAN.
DEVICE FOR COUPLING THE STEAM PIPES OF RAILWAY TRAINS.

No. 391,089. Patented Oct. 16, 1888.

WITNESSES:
Frank E. Hartley.
Frank B. Murphy.

INVENTOR:
Daniel H. Sherman.
BY
Duncan Curtis & Page
ATTORNEYS.

UNITED STATES PATENT OFFICE.

DANIEL H. SHERMAN, OF BROOKLYN, NEW YORK.

DEVICE FOR COUPLING THE STEAM-PIPES OF RAILWAY-TRAINS.

SPECIFICATION forming part of Letters Patent No. 391,089, dated October 16, 1888.

Application filed August 19, 1887. Serial No. 247,337. (No model.)

*To all whom it may concern:*

Be it known that I, DANIEL H. SHERMAN, a citizen of the United States, residing at Brooklyn, in the county of Kings and State of New York, have invented certain new and useful Improvements in Devices for Coupling the Steam-Pipes of Railway-Trains, of which the following is a specification, reference being had to the accompanying drawings.

This invention is an improvement pertaining to steam pipes and tubes, particularly applicable to the steam-pipes used on railway-cars for conducting the steam from the engine to the heaters on the several cars of the train, or for other analogous purposes.

The invention resides, mainly, in a novel form of coupling for connecting the ends of such pipes and in having the ends of the pipes unattached or flexibly attached to the ends of the cars, as hereinafter described and claimed.

Many attempts have been made to produce a more durable coupling for these steam-pipes than the flexible hose heretofore in general use; but the requirements of a practicable coupling make this a very difficult matter. The cars are constantly shifting their relative positions, and a coupling, in order to prove successful, must be capable of allowing for considerable vertical, transverse, longitudinal, or rocking movement in either or both of the two adjoining cars between which it is used. Such a device I have succeeded in producing, and I have further improved it in such manner that a separation of two cars will automatically separate the parts of the coupling without doing it any injury.

The special object of my invention is to make a coupling capable of use and operation as above set forth of some simple construction and containing fewer operative parts and joints than heretofore designed for a like purpose. These objects I attain by supporting the main pipes under the cars in such manner that their ends shall be capable of a certain vertical movement or play, and with these I combine a new and improved coupling, the several parts or elements of which are preferably of metal, but are provided with certain joints which unite them together and permit a sufficiently free movement of the parts one upon the other to compensate for all the ordinary displacements to which the cars are liable to be subjected.

The details of this invention in the best and most practicable form of which I am now aware I have illustrated in the accompanying drawings.

Figure 2:
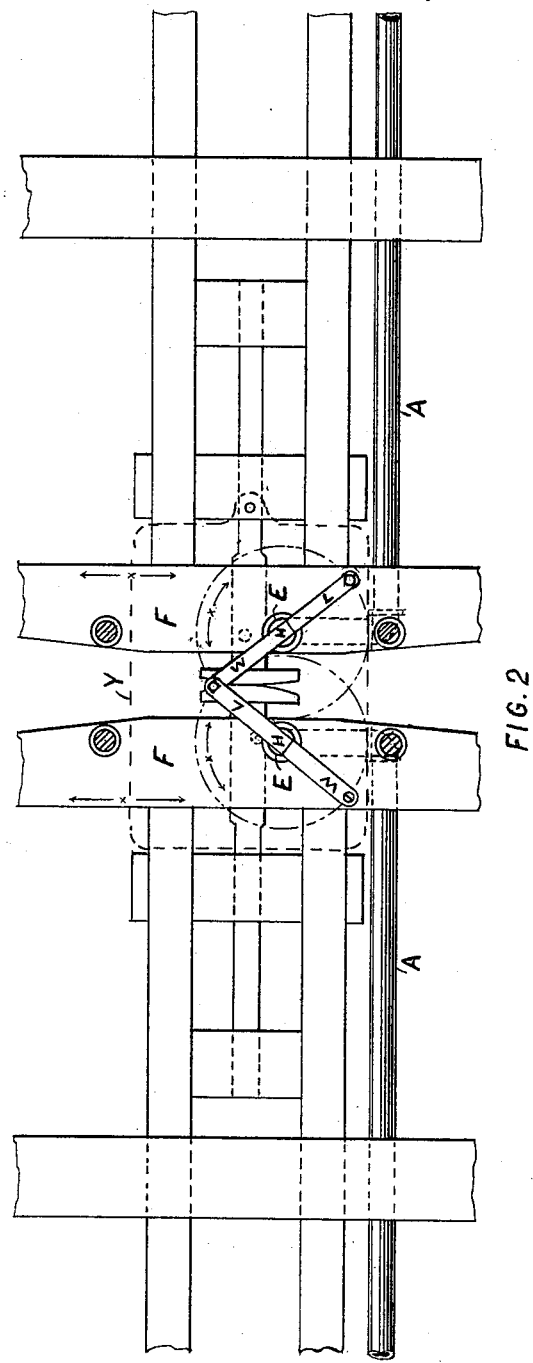
Figure 11:
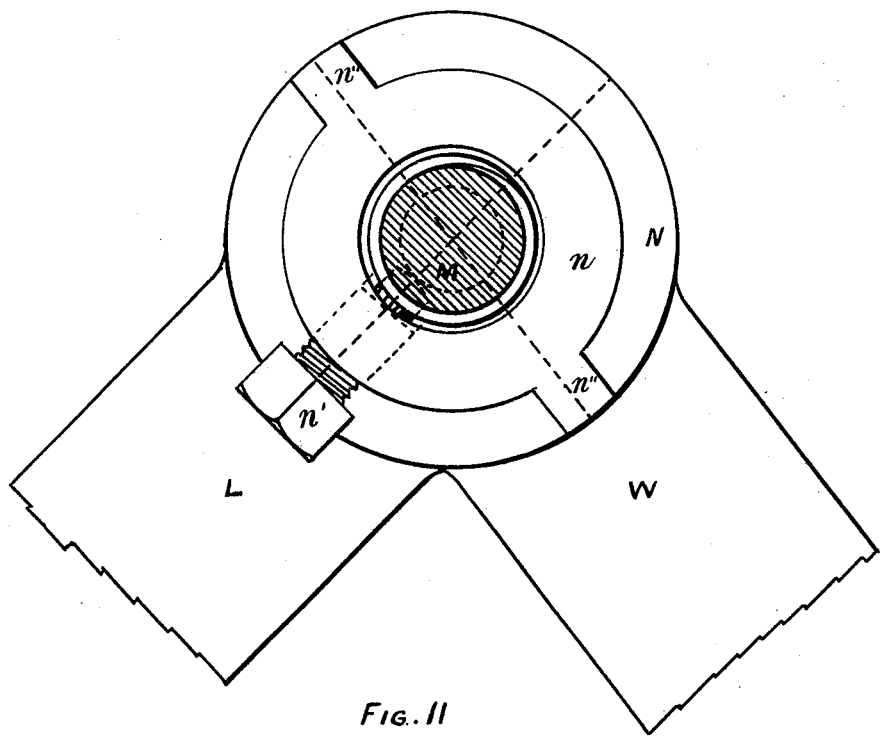

Figure 1 is a longitudinal section through two contiguous platforms of a train, exhibiting the manner of supporting the steam-pipes, the general construction of the coupling, and the relations of the several parts thereof when operatively connected. Fig. 2 is a plan view of the steam-pipes and coupling and a portion of the platforms represented in Fig. 1. Fig. 3 is a view, partly in elevation and partly in broken section, of the coupling, showing in detail its construction and the manner in which its parts are to be connected for use. Fig. 4 is a detail plan of the same. Fig. 5 is a detail of the upper side of the end of one of the arms comprising the coupling. Fig. 6 is a detail, partly in section, of that portion of the coupling which operates to secure the union of the two members. Fig. 7 is a plan view of the bearing-surfaces of the upper member of the coupling. Fig. 8 is a part-sectional view of the union-joint between the main pipe and the coupling proper. Fig. 9 is a side elevation of a modified form of the coupling as illustrated in Fig. 3. Fig. 10 is a plan view of the same. Fig. 11 is a plan view of the upper surface of the parts of the clamping device shown in Fig. 7.

Corresponding parts in the several figures are indicated by the same reference letters and figures.

Referring to Figs. 1 and 2, I have illustrated the general construction and relations of two car-platforms provided with a Miller coupler, showing only so much of the latter as is necessary to a clear understanding of the preferred arrangement of my improved steam-pipe coupling.

The main steam-pipes, which run under the cars, are lettered A A. They are secured to the car at some distance from the coupling, as to the bolster B, over the truck, as shown in Fig. 1. Inasmuch as a considerable length of the pipe will have a certain flexibility, the ends will be capable of a certain vibration or play when thus supported. I may, however, support the ends by an elastic or equivalent connection—such as a weight and cord or a balance-spring, C, with or without guides or suspenders—so that while the weight of the pipe will be in a measure sustained by the spring its free vertical movement will not be interfered with.

In each of the end timbers, F, of the platforms is set a metallic bushing or sleeve, G, through which extends a hollow spindle, E, connected by a union-coupling, D, to the pipe A, or to a horizontal branch thereof. The coupling referred to consists of the ordinary screw-sleeve, R, containing the flanged ends S S of the two pipes A and E, between which is a packing-ring, T, preferably of copper, bearing on Babbitt or similar metal, U, cast into the faces of the two flanges S S. The screw-threaded sleeve R is secured when screwed to place by set-screw V, passing through its side and impinging on the pipe A.

Fixed to or cast in one piece with the spindles E are the coupling devices, consisting of a body, H, with two or more arms, L L W. These parts being rigidly connected to or integral with the spindle E turn with it, and a passage or channel is formed through them in such a way that when connected the steam passes from one car to an adjacent car without interruption through ports formed in the joints. To accomplish this I make the lower of the arms L and the arm W of each coupling member hollow. Near the end of arm W, on its under side, is an opening through a somewhat prominent and smoothly-ground bearing-face, P. In this opening is an ordinary check-valve, K, working by gravity and steam-pressure to prevent the escape of steam when the coupling is disconnected. At the end of the lower arm L is a corresponding opening containing a similar check-valve, K. Around the opening is a recess or seat into which the bearing-face P of a coupling fits smoothly.

The upper of the arms L carries a clamping device of suitable construction, which presses upon the end of the arm W when the face P is inserted in its approximate seat, and maintains a steam-tight connection, while permitting a rotary movement of one arm on the other to compensate for the lateral and longitudinal movements of the cars. For this purpose I use a binding-screw, M, which passes through the upper branch of arm L. The projecting end of this screw enters a boss, $n$, on the upper side of a plate, N. This boss is either made rectangular or is provided with lugs or wings $n''$, (shown in Fig. 7,) and serves as a guide, which, entering a corresponding recess in the arm L, prevents the plate N from turning. A retaining-screw, $n'$, passes through the side of boss $n$, and, entering a groove in the screw M near its end, secures the plate N to the screw. By this means the plate N is made adjustable with reference to the two branches of the arm L.

The upper surface of arm W is formed with or carries a corresponding plate, O, and when the arms L and W are coupled the screw M is turned, clamping the plates N and O firmly together and securing a good steam-tight connection between the surface P and its seat. While this condition of the parts is maintained the two elements of the coupling may not be pulled apart without injury to the apparatus. I make provision for the separation of the two parts of the coupling by so adapting the contiguous surfaces of the plates N and O to one another that when the two arms L and W are drawn out into alignment the pressure between them will be relieved, whereby a sufficient movement of one surface beyond or into the other will permit the rounded surface P to slide up and out of its seat and allow the two parts of the coupling to separate freely. The way which I have selected in illustration of this feature of my invention is shown in detail in Figs. 3 to 7. The surface of plate N is stepped—that is to say, one-half is somewhat higher than the other. The same is true of the surface of plate O. I have indicated the depressed or cut-away portions of both plates by Q. Now, it is evident that when plates N and O are brought together the higher portions of their respective surfaces will bear upon each other, except in that position when the higher portion of one is directly over the lower portion of the other, in which case the plates may be moved closer together by the depth of the steps or the depressed portions. I utilize this feature by so arranging the steps on each plate that the higher portions of the plates will always be in contact except when the two arms L and W are brought into line. At such time the higher portions of the plates are turned so that they are immediately over the depressed portions of the opposite plates, so that the surface P may be drawn up out of its seat. The steps on N O will then slip by each other. The diametrical lines across the plates N O in Figs. 4, 5, and 7 indicate the edges of the steps or the line between the higher and lower portions of the surfaces of said plates. Thus, should two cars become uncoupled, either by accident or design, the steam-coupling will be pulled apart as soon as the arms L L of one member and W of the other are brought in line, which releases the clamp and permits the face P to rise from its seat and the arms L and W to pass one another.

In their normal positions the parts H rest upon the sleeves G, or, what is practically the same thing, one of the arms W L rests upon the platforms; but if the platforms are of uneven heights, or if they vary from the same level, the spindle E, slipping through its sleeve G, compensates for the difference and the coupling-arms retain their normal position. In doing this the ends of the steam-pipes A will be raised or lowered, as the case may be, which is effected easily on account of the balancing effect of the spring-supports G.

The mode of using and the operation of this mechanism are as follows: Two cars after being coupled have their steam-pipes connected by bringing the ends of arm W on one car between arms L L on the other. The adjustable clamp N, which is raised for this purpose, is then depressed until by the pressure between the clamp and the surface O the face P is forced steam-tight into its socket in the lower arm L. Should the cars while in motion be carried out of line, as they are in rounding a curve, the connected arms L and W turn in the direction of that movement. On the other hand, when the cars separate or approach within the limits permitted by the car-couplers the arms L W will open or close to allow for such movement. A very slight movement or play between the clamp and surface O and the face P and the socket or recess in which it rests will be sufficient to compensate for any ordinary rocking movement of the cars, such as is likely to be produced by curves or an uneven track.

The couplings may be placed in any desired position and either above or below the platform. In the present case the drawings represent a coupling above the level of the platform, and in such cases it is desirable to protect it, as by means of a low cover or bridge, Y, which spans the space between the cars.

In this coupling which I have described there are three arms, W L L; but this construction may be modified in various ways. For example, in Figs. 9 and 10 I have shown a modification of the coupling in which but two arms are required. In this device the upper and solid arm, L, carrying the screw M, is made much shorter than the lower and hollow arm, L'. In the arm L' are two openings, one on the upper side directly under the screw M and formed as a socket to receive the bearing-face P, the other on the under side at the end formed with a smooth rounded bearing-face, P. Each opening is provided with an automatic check-valve, as in the previous case. This form has the advantage of dispensing with one of the arms, while still having a male and a female element of the coupling, so that two cars may always be coupled whichever ends are presented. It will be observed that this device provides for all the ordinary relative changes of position of two adjoining cars, while it has but three joints. In this respect it is much more simple than others, while its material and peculiar construction make it in other respects a very desirable appliance.

The invention above described as applied to the special purposes of connecting the steam-pipes of railway-cars is equally useful as a coupling generally for any pipes conveying steam under pressure, water, or other fluid where it is desirable to maintain the arms of the coupling located upon parts of structures which are liable to change their relative positions at substantially the same level or height.

I do not desire to limit my invention to the special form of devices or mechanisms for connecting the ends of the pipes, as it is evident that various forms of mechanism or couplings can be used for this purpose and obtain substantially the same results, provided the ends of the pipes are flexibly connected to the cars, so that they need not conform to the vertical movements of the cars.

What I claim as new is—

1. The combination, with the steam-pipe of a railway-car, secured to the car with its end free, so that it is capable of a vertical movement or play relatively to the level of the platform of its own or a contiguous car, of a pipe or hollow arm coupled to said main steam-pipe and provided with a joint which permits its end to swing or move laterally as the relative position of contiguous cars varies laterally, and a steam-tight connection from said hollow arm to the main steam-pipe of a contiguous car, as set forth.

2. In a steam-coupling for railway-cars, the combination, with two coupled swinging hollow arms or pipes, the contiguous surfaces of said coupling being free to turn one on the other, of a clamp for maintaining said surfaces in steam-tight connection, the two contiguous parts or faces of the clamps being formed with raised and lowered portions adapted to register and to sink one into or past the other and release the clamping-pressure when the swinging arms are drawn into alignment, as set forth.

3. In a steam-coupling for railway-cars, the combination, with two coupled swinging hollow pipes or arms, the contiguous surfaces of said coupling being free to turn one on the other, of clamping-plates carried by the arms, with their contiguous faces formed with steps or shoulders set relatively to each other so that when the two arms are at an angle the raised portions of the plates will be in contact, but when the arms are brought into alignment the said portions will be turned out of contact and pass by one another, as herein set forth.

4. The combination, with the main steam-pipe connected to the car in the manner described, whereby its free ends are capable of a vertical movement or play relatively to the platform of the car, of a pipe or hollow arm connected to the end of the main pipe and extending up loosely through the platform, and a coupling or steam-connection uniting said arm with the steam-pipe of a contiguous car.

5. The combination, with main steam-pipes secured to railway-cars with their ends free to permit by the flexibility of the pipes a vertical movement or play relatively to the platforms, of couplings consisting of two angle-pipes or hollow arms coupled or joined to the main pipes and jointed so as to be capable of swinging or turning laterally, the said pipes extending loosely up through the platforms and coupled together, as herein set forth.

6. The combination, substantially as set forth, with the swinging arms L W, coupled to the steam-pipes of two contiguous cars and provided, respectively, with the bearing-surface P and a seat therefor, of an adjustable clamping device for holding such surfaces in contact, the contiguous faces of the two parts or elements of the clamp being formed with steps or raised and depressed portions, the steps of one face being adapted to register with and pass into the depressed portions of the other when the arms by which they are carried are brought into alignment.

7. The combination, substantially as set forth, with the steam-pipes A A, having their ends capable of vertical movement, of spindles E, connected at right angles to the pipes by union-joints D and extending up through the car-platforms, and the solid and hollow arms projecting from said spindles and coupled together to form a passage for steam from one pipe to another.

DANIEL H. SHERMAN.

Witnesses:
ROBT. F. GAYLORD,
FRANK E. HARTLEY.